(12) United States Patent
Dick (10) Patent No.: US 10,392,148 B2
(45) Date of Patent: *Aug. 27, 2019

(54) SAND BAG SHOVEL ASSEMBLY (71) Applicant: Michael H. Dick, Clear Lake, IA (US)

(72) Inventor: Michael H. Dick, Clear Lake, IA (US)

( * ) Notice: Subject to any disclaimer, the term of this patent is extended or adjusted under 35 U.S.C. 154(b) by 28 days.

This patent is subject to a terminal disclaimer.

(21) Appl. No.: 15/668,228

(22) Filed: Aug. 3, 2017

(65) Prior Publication Data

US 2017/0325391 A1    Nov. 16, 2017

Related U.S. Application Data

(63) Continuation of application No. 14/731,136, filed on Jun. 4, 2015, now Pat. No. 9,781,871.

(60) Provisional application No. 62/007,471, filed on Jun. 4, 2014.

(51) Int. Cl.
| | |
|---|---|
| *B65B 67/04* | (2006.01) |
| *A01B 1/02* | (2006.01) |
| *B65B 1/06* | (2006.01) |
| *B65B 39/08* | (2006.01) |
| *B65B 67/12* | (2006.01) |
| *E02B 3/12* | (2006.01) |
| *A01B 1/00* | (2006.01) |
| *B65B 1/00* | (2006.01) |

(52) U.S. Cl.
CPC ............... *B65B 67/04* (2013.01); *A01B 1/02* (2013.01); *A01B 1/022* (2013.01); *B65B 1/06* (2013.01); *B65B 39/08* (2013.01); *B65B 67/12* (2013.01); *E02B 3/127* (2013.01); *A01B 1/00* (2013.01); *B65B 1/00* (2013.01)

(58) Field of Classification Search
CPC ..... B65B 67/04; B65B 39/08; B65B 67/1233; B65B 67/12; B65B 67/1238; B65F 1/1415
USPC ................................ 141/331–345, 391, 108
See application file for complete search history.

(56) References Cited

U.S. PATENT DOCUMENTS

| | | | | |
|---|---|---|---|---|
| 478,913 A | * | 7/1892 | Bratney | B65B 67/12 248/99 |
| 744,338 A | * | 11/1903 | Hall | B65B 67/04 141/108 |
| 1,987,011 A | * | 1/1935 | Kahn | A23B 4/021 210/470 |
| 4,130,147 A | * | 12/1978 | Langlie | B67C 11/02 141/333 |
| 4,149,745 A | * | 4/1979 | Willis | E01H 1/1206 15/257.1 |
| D333,888 S | * | 3/1993 | Visser | 294/1.4 |
| D374,110 S | * | 9/1996 | Hull | 294/1.4 |
| 7,588,217 B1 | * | 9/2009 | Rooker | B65B 39/08 248/94 |
| 7,665,489 B1 | * | 2/2010 | Smith | B65B 67/12 141/10 |

(Continued)

FOREIGN PATENT DOCUMENTS

DE    102004063896 A1 *  3/2006  .............. A01B 1/02

*Primary Examiner* — Timothy L Maust
*Assistant Examiner* — Timothy P. Kelly
(74) *Attorney, Agent, or Firm* — Zarley Law Firm, P.L.C.

(57) ABSTRACT

A sand bag shovel having an elongated rod connected to a connecting member and the connecting member attached to a scoop. The scoop has a pair of sidewalls and a front wall with tapered panels that form a peak. A funnel is used with the scoop that has a flange that extends outwardly from a top opening.

8 Claims, 6 Drawing Sheets

(56) References Cited

U.S. PATENT DOCUMENTS 7,686,360 B2 * 3/2010 Platt .................... A01K 1/0114
294/1.3

* cited by examiner

SAND BAG SHOVEL ASSEMBLY

CROSS REFERENCE TO RELATED APPLICATION

This application is a continuation of U.S. application Ser. No. 14/731,136 filed Jun. 4, 2015 that claims the benefit of U.S. Provisional Application No. 62/007,471 filed Jun. 4, 2014.

BACKGROUND OF THE INVENTION

This invention relates to a shovel funnel assembly. More specifically and without limitation, this invention is directed towards a system for a sand bag shovel assembly.

When severe weather occurs and there is a risk of flooding sandbags are commonly used to surround buildings to prevent water from damaging the structure both internally and externally. Sandbags are also used to fortify a variety of structures including levees and military outposts.

Sandbags are optimal in the above situations because fortification is needed quickly and cheaply. Traditionally, to prepare a sandbag for use the bags are filled with one individual holding a bag open that is positioned on the ground, while a second individual uses a shovel to fill the bag with sand, soil, or some other material. While this system allows for sand bags to be made, this approach has a number of deficiencies.

First, the system requires two individuals to make a single bag. This can be difficult in flooding scenarios where many structures need the protection of sandbags but there are not enough individuals available to fill the bags required. Further, the use of two individual's cuts in half the production speed of making the sand bags compared to a system that only uses a single person to prepare a bag. In emergency situations speed is of the utmost importance and often times the lack of sand bags results in unnecessary damage to structures. Second, the conventional approach causes physical strain on the individuals making the bags as the person holding the bag must be hunched over to hold open the bag and the person filling the bag must bend over to scoop up material to then fill the bag.

Thus it is a primary objective of the invention is to provide a sand bag shovel assembly that improves upon the state of the art.

Another objective of the invention is to provide a sand bag shovel assembly that allows a sand bag to be filled by a single person.

Thus it is a primary objective of the invention is to provide a sand bag shovel assembly that is easy to use.

Another objective of the invention is to provide a sand bag shovel assembly that inexpensive.

Yet another objective of the invention is to provide a sand bag shovel assembly that is durable.

Another objective of the invention is to provide a sand bag shovel assembly that has a long and useful life.

Yet another objective of the invention is to provide a sand bag shovel assembly that has an intuitive design.

Another objective of the invention is to provide a sand bag shovel assembly that has a minimum number of parts.

Yet another objective of the invention is to provide a sand bag shovel assembly that is simple.

Another objective of the invention is to provide a sand bag shovel assembly that can quickly fill a sand bag.

Yet another objective of the invention is to provide a sand bag shovel assembly that allows for onsite filling of sand bags.

Another objective of the invention is to provide a sand bag shovel assembly that prevents spillage.

These and other objects, features, or advantages of the inventions will become apparent from the specification and claims.

BRIEF SUMMARY OF THE INVENTION

A sand bag shovel assembly is presented. The sand bag shovel assembly includes a shovel and a funnel. The shovel having a rod connecting to a scoop by a connecting member. The scoop having a forward sloping front wall. The funnel having a top opening and a bottom opening wherein a top flange extends around the top opening of the funnel. Attached to the underside of the top flange is a tab and a clip. The tab attaches to a vehicle and the clip holds an empty bag in place while being filled. The sand bag shovel assembly allows two users to fill a sand bag will little to no spillage.

DETAILED DESCRIPTION OF THE PREFERRED EMBODIMENT

Figure 1:
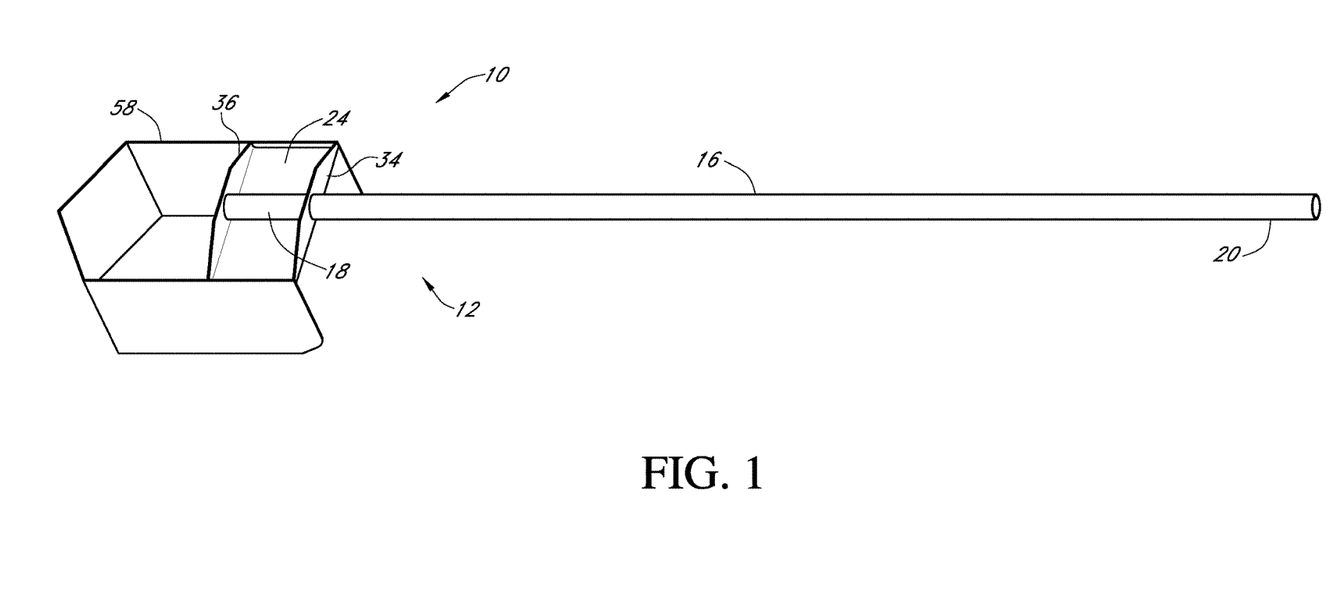
FIG. 1 is a perspective view of the shovel of the sand bag shovel assembly.
Figure 2:
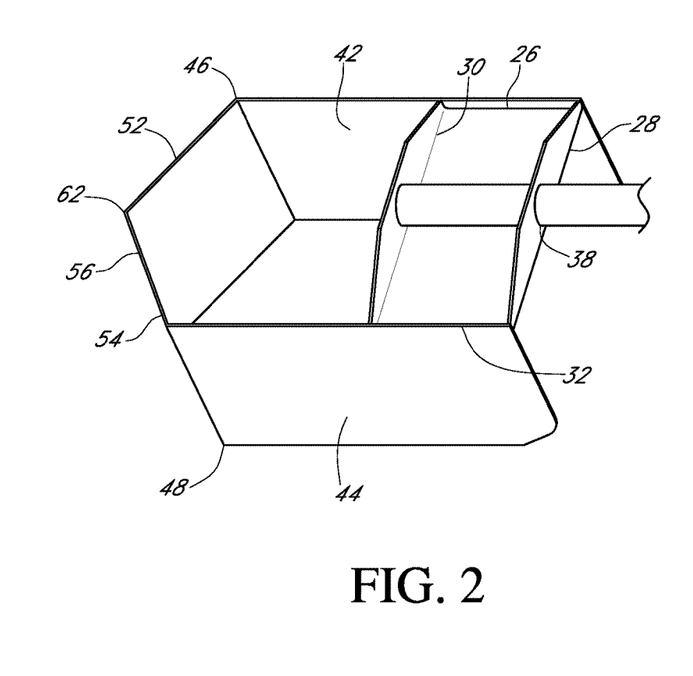
FIG. 2 is a perspective view of the shovel of the sand bag shovel assembly
Figure 3:
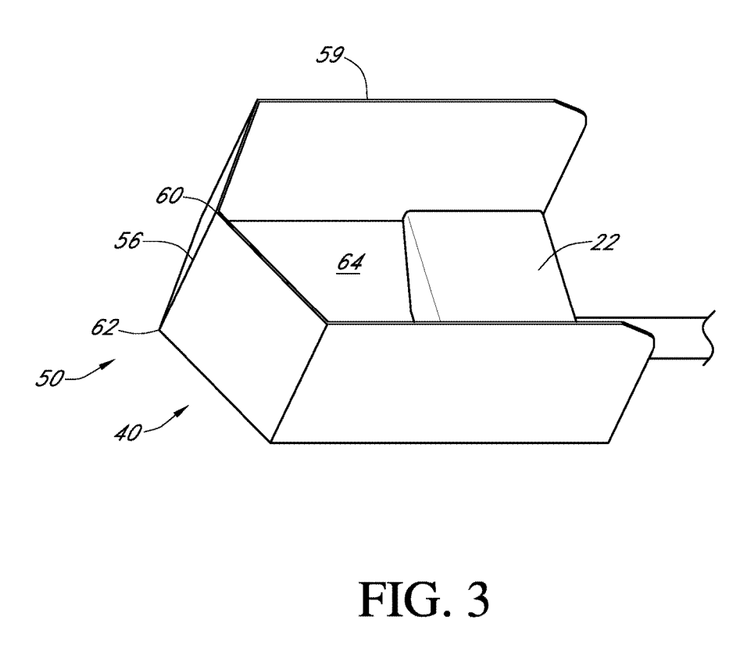
FIG. 3 is a perspective view of the shovel of the sand bag shovel assembly
Figure 4:
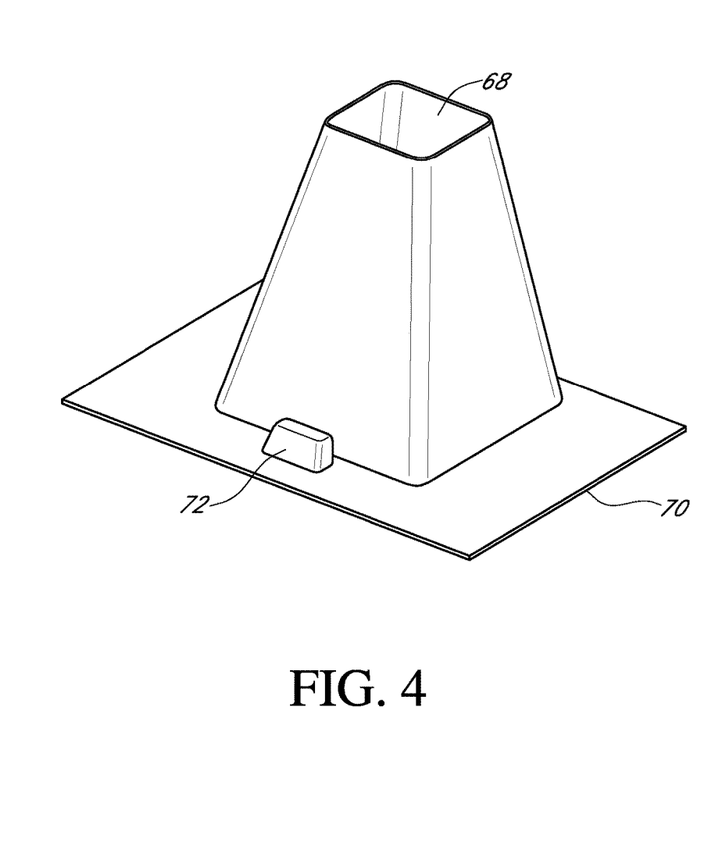
FIG. 4 is a perspective view of the funnel of the sand bag shovel assembly.
Figure 5:
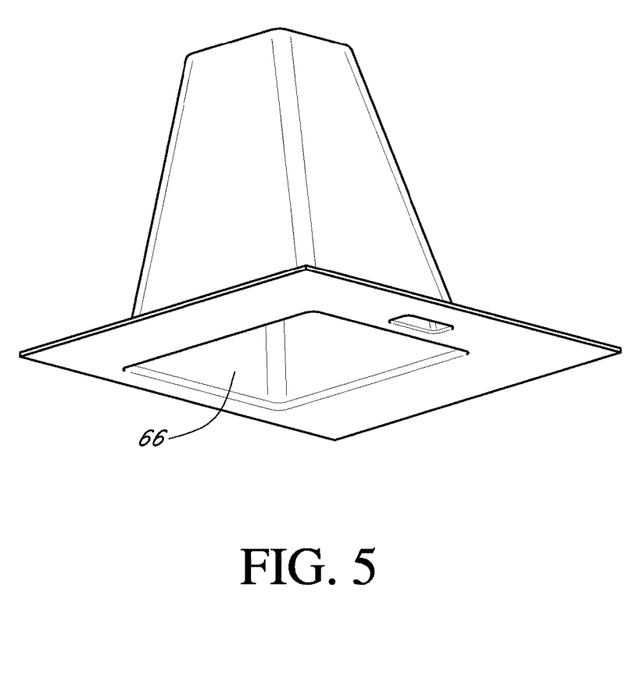
FIG. 5 is a perspective view of the funnel of the sand bag shovel assembly.
Figure 6:
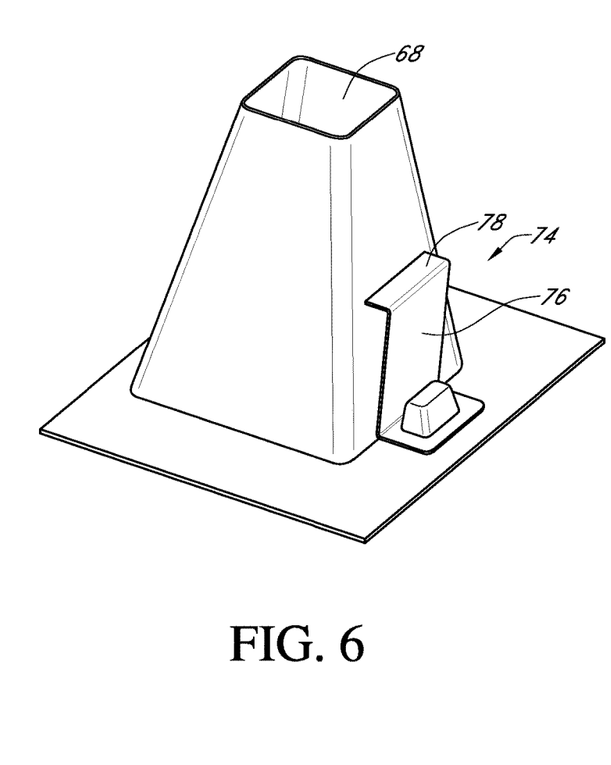
FIG. 6 is a perspective view of the funnel of the sand bag shovel assembly.

With reference to the figures, a sand bag shovel assembly 10 is presented. In the embodiment shown, the sand bag shovel assembly 10 includes a shovel 12 and a funnel 14. The shovel 12 has an elongated rod 16 having a first end 18 and a second end 20. In one embodiment, the rod is made of aluminum, but any suitable material can be used including plastics, metals, and woods. The first end 18 connects to a connecting member 22.

In the arrangement shown, the connecting member 22 has a center portion 24 having a top edge 26, side edges 28, 30, and a bottom edge 32. In one embodiment, the connecting member 22 is a flat aluminum, but any suitable material can be used including plastics, metals, and woods.

Extending upwardly and perpendicularly to the center portion 24 is a first flange 34 and a second flange 36. In one embodiment, the first flange 34 extends from a first side edge 28 and the second flange extends from a second side edge 30 of the connecting member 22. In the arrangement shown, the first flange 34 and the second flange 36 have a trapezoidal shape. In one embodiment the first flange 34 has a central opening 38. The first flange 34 and the second flange 36 can be connected to the center portion 24 in any manner such as permanent connection by welding or by formation out of a single piece of material.

In the arrangement shown, the first end 18 of the elongated rod 16 extends through the opening 38 of the first flange 34 and connects to the second flange 36. In one embodiment, the elongated rod 16 is permanently connected to the first flange 34 and second flange 36 by full aluminum welds at all interfacing surfaces but other methods of permanent connection are contemplated. In alternative embodiments, the elongated rod 16 can be separable from the connecting member 22.

A scoop 40 is connected the connecting member 22. In one embodiment, the scoop is a flat aluminum, but any suitable material can be used including plastics, metals, and woods. The scoop 40 has a first sidewall 42 and a second side wall 44 connected to a first side 46 and a second side 48 of a front wall 50. In the arrangement shown, the first sidewall 42 and the second sidewall 44 are permanently connected to the front wall 46 by formation out of a single piece of material but can be connected by other methods such as welding.

The front wall 50 has a first panel 52 that extends tapers inwardly from the first side 46 and a second panel 54 that tapers inwardly from the second side 48 until the first panel 52 and second panel 54 intersect at a peak 56. In the arrangement shown, the first panel 52, second panel 54 slope outwardly on a top side 58 of the scoop 40 such that the peak 56 slopes outwardly from a first point 60 to a second point 62. In one embodiment, this slope is such that the second point 62 extends ahead of the first point 60 and making the top side 58 of the scoop larger than a bottom side 59 of the scoop 40.

The connecting member 22 is partially attached to the top side 58 of the scoop 40. In one embodiment the connecting member 22 is attached to the scoop 40 permanently by full aluminum welding, but other methods of attachment are contemplated such as by formation out of a single piece of material. In the arrangement shown, the top edge 26 of the connecting member 22 is attached to the first sidewall 42 and the bottom edge 30 is attached to the second sidewall 44. In this arrangement, the connecting member 22 is attached to the scoop 40 at the side opposite the front wall 50 leaving a gap 64 in the scoop 40.

The funnel 14 has a top opening 66 and a bottom opening 68. In the embodiment shown, the funnel 14 tapers inwardly from the top opening 66 to the bottom opening 68. In one embodiment, the top opening 66 is a similar size as a bottom side 59. Extending outwardly from the top opening 66 is a top flange 70. Extending down from one side of the top flange 70 is a tab 72. In the embodiment shown, the tab 72 has a trapezoidal shape. In alternative embodiments, the tab 72 is of any shape and size. Hanging down from the top flange 70 is a clip 74. In one embodiment, the clip 74 has an L-shape formed by a main portion 76 and a lip 78 that extends perpendicular to the main portion 76 and engages the side of the funnel 14. In this way the main portion 76 maintains a level position of the funnel 14 as the clip 74 and the top flange 70 form a right angle. In one arrangement, the clip 74 is positioned between the funnel 14 and the tab 72. In alternative arrangements, multiple clips 74 are positioned around the funnel 14.

In one embodiment the funnel 14 is made of aluminum, but other materials such as metals, plastics, and woods. In one arrangement, the tab 72 and clip 74 are permanently connected to the top flange 70 of the funnel 14 by full aluminum welds, but other methods of connection are contemplated including by formation out of a single piece of material.

In Operation: A vehicle having a flatbed filled with a filling material is brought to a location where sand bags are needed. The filling material can be any suitable material including sand and soil. A user places the funnel 14 on the side of the flatbed or vehicle by placing the tab 72 within a notch (not shown) of the flatbed or vehicle. Next, the user places an empty bag over the bottom opening 68 of the funnel 14 and uses the clip or clips 74 to hold the funnel level with the flatbed. Alternatively the bag could be clipped to the funnel.

Once the empty bag is secured, the user lifts the shovel 12 into the flatbed using the elongated rod 16. The user than drags the scoop 40 along the flatbed towards the funnel 14 with the top side 58 up. In this manner, as the scoop 40 is dragged across the flatbed, the filling material accumulates in the scoop 40. The outwardly extending peak 56 allows for more filling material to be gathered towards the top side 58 of the scoop 40 while allowing the bottom side 59 to match the top opening 66 of the funnel 14 to avoid spillage.

Additionally, the gap 64 in the scoop 40 allows the filling material to spill out the top side 58 of the scoop 40 thereby preventing the scoop 40 from getting full and simply pushing any additional filling material out of the flatbed. Next, the scoop 40 is pulled over the top opening 66 of the funnel 14 and the material drops through the funnel 14 and into the empty bag.

From the above discussion, it will be appreciate that the sand bag shovel assembly presented improves upon the state of the art. Thus it is a primary objective of the invention is to provide a sand bag shovel assembly that improves upon the state of the art. That is, the sand bag shovel assembly presented allows a sand bag to be filled by a single person; is easy to use; is inexpensive; is durable; has a long and useful life; has an intuitive design; has a minimum number of parts; is simple; can quickly fill a sand bag; allows for onsite filling of sand bags; and prevents spillage.

It will be appreciated by those skilled in the art that other various modifications could be made to the device without parting from the spirit and scope of this invention. All such modifications and changes fall within the scope of the claims that are intended to be covered thereby.

What is claimed:

1. A funnel assembly for a sand bag shovel assembly, comprising:
   a funnel having a flange that extends outwardly from a top opening of the funnel;
   a tab extending down from the flange;
   a clip extending down from the flange; and
   wherein the clip has a main portion and a lip that extends perpendicular to the main portion and engages a side of the funnel.

2. A sand bag shovel assembly, comprising:
   a funnel having a flange that extends outwardly from a top opening of the funnel;
   a tab extending down from the flange;
   a clip extending down from the flange;
   wherein the clip has a main portion and a lip that extends perpendicular to the main portion and engages a side of the funnel; and
   a shovel.

3. The assembly of claim 2 further comprising the shovel having a scoop that has a front wall, a first sidewall, and second sidewall that form a first opening on a top side and a second opening on the bottom side; and an elongated rod having a first end and a second end, wherein the first end is connected to the scoop.

4. The assembly of claim 2 further comprising a rear side of the scoop forming an opening.

5. The assembly of claim 3 further comprising a connecting member connected between the first sidewall and the second sidewall along a top edge of the top side, such that a gap is formed in the top opening between the front wall and the connecting member.

6. The assembly of claim 5 further comprising the connecting member having a center portion having a top edge, a bottom edge, a first side edge, and a second side edge, wherein the top edge connects to the first sidewall and bottom edge connects to the second sidewall.

7. The assembly of claim 6 further comprising a first flange connected to and extending upwardly from the first side edge, and a second flange connected to and extending upwardly from the second side edge, wherein the first flange has a central opening such that the elongated rod extends through the central opening of the first flange and connects to the second flange.

8. The assembly of claim 3 further comprising the front wall having a first panel and a second panel that taper inwardly in relation to each other and outwardly in relation to the first sidewall and the second sidewall such that a peak is formed, wherein the first panel and second panel slope outwardly from a first point on the bottom side to a second point on the top side such that the second point extends ahead of the first point.

\* \* \* \* \*